United States Patent [19]

Cook et al.

[11] Patent Number: 4,964,027
[45] Date of Patent: Oct. 16, 1990

[54] HIGH EFFICIENCY POWER GENERATING SYSTEM

[75] Inventors: Alexander Cook; John N. Rice; David H. Hitt, all of Rockford, Ill.

[73] Assignee: Sundstrand Corporation, Rockford, Ill.

[21] Appl. No.: 446,430

[22] Filed: Dec. 5, 1989

[51] Int. Cl.⁵ .................. H02M 1/12; H02M 1/14
[52] U.S. Cl. ........................... 363/40; 363/46; 363/84; 363/95
[58] Field of Search ............ 363/39, 40, 44, 45, 363/46, 47, 48, 71, 78, 79, 81, 84, 95; 307/22, 26, 72

[56] References Cited

U.S. PATENT DOCUMENTS

| | | | |
|---|---|---|---|
| 3,241,038 | 3/1965 | Amato | 321/44 |
| 3,501,686 | 3/1970 | Tveteras et al. | 321/9 |
| 3,839,667 | 10/1974 | King | 321/9 R |
| 4,195,333 | 3/1980 | Hedel | 363/46 |
| 4,204,264 | 5/1980 | Lipman | 363/71 |
| 4,382,275 | 5/1983 | Glennon | 363/41 |
| 4,682,369 | 7/1987 | Schrader | 363/46 |
| 4,761,725 | 8/1988 | Henze | 363/46 |

Primary Examiner—Peter S. Wong
Attorney, Agent, or Firm—Antonelli, Terry, Stout & Kraus

[57] ABSTRACT

A power generating system (10) in accordance with the present invention includes a converter (14) for producing an AC output (16) including a fundamental and at least one harmonic of the fundamental; a frequency analyzer (18), having at least one input coupled to the AC output, for providing an analysis of a frequency spectrum of the AC output; a processor (36), coupled to the frequency analyzer, for calculating at least one switching frequency, each switching frequency being used for transforming a different harmonic within the AC output back to the fundamental; a controller (34), responsive to the at least one calculated switching frequency, for producing control signals at the at least one calculated frequency for transforming the at least one harmonic back to the fundamental; a separating filter (24), coupled to the AC output, for separating the fundamental and that at least one harmonic; at least one converter (30 and 32), coupled to the at least one harmonic from the converter and to the controller, each converter being switched by control signals from the controller which have a calculated switching frequency for transforming at least one of the at least one harmonic to the fundamental; and outputs from the at least one converter being combined with the fundamental from the separating filter.

34 Claims, 4 Drawing Sheets

HIGH EFFICIENCY POWER GENERATING SYSTEM

TECHNICAL FIELD

The present invention relates to AC and DC electrical power generating systems.

BACKGROUND ART

Numerous electrical power generating systems exist for generating AC and DC electrical power. It is a design objective of electrical power generating systems to achieve the highest possible energy conversion efficiency. In an AC generating system, the intent is to eliminate undesired harmonics. In a DC power generating system, the intent is to eliminate ripple. The prior art utilizes numerous mechanisms for attenuating undesired AC components which are produced by AC and DC power generating systems using passive or active filtering techniques. These systems are effective in eliminating the undesirable and potentially load damaging AC frequencies. However, filtering inherently results in a lowering of energy conversion efficiency as a consequence of the undesired AC components being eliminated from the energy which is applied to the load by filtering. Moreover, the filters which are required to eliminate the undesired AC components in high power electrical power generating systems are heavy in weight which is a disadvantage for applications such as in airframes where elimination of weight is of extreme importance. Additionally, filters for high power applications are expensive and are sizable which is an additional disadvantage in applications such as airframes where space allocation is important.

Examples of power generating systems which are designed to lessen harmonics are disclosed in U.S. Pat. Nos. 3,241,038, 3,501,686, 3,839,667, 4,204,264 and 4,382,275.

In state of the art electrical power generating systems substantial energy is lost in the power generating process as undesired harmonics or ripple. A typical AC generating system, such as the type utilized in an airframe prior to filtering of the output AC, has from 3%–8% of its total output power contained in undesired harmonics. Reduction of the harmonic content outputted by an AC generating system and ripple in a DC power generating system in an airframe is highly desirable from an operating standpoint. Achieving of a higher power generation efficiency than currently available to date would permit the rated capacity of the power generating systems to be downsized resulting in an attendant weight savings and further would potentially result in a reduction in weight of the required filtering depending upon the weight of additional components required to electronically lower harmonic or ripple content.

DISCLOSURE OF INVENTION

The present invention provides a high efficiency electrical power generating system which may be used for generating AC or DC power. The invention is applicable to electrical power generating systems utilized on airframes for generating 440 Hz. AC, 270 volt DC, and a combination of 440 Hz. and 270 volt DC.

The present invention provides a high efficiency electrical power generating system which may be used for generating AC or DC which transforms undesired harmonics if the power generating system is producing AC to the fundamental AC frequency produced by the power generating system and transforms undesired ripple back to DC if the power generating system is producing DC. The present invention analyzes the spectral content of the power generated by an AC or DC power generator and upon detecting of a harmonic or frequency component having a voltage level above a threshold calculates a switching frequency which is the frequency of control signals generated by a controller for switching a converter coupled to harmonics above the fundamental if the power generating system is an AC power generating system and to AC frequency components if the power generating system is a DC power generating system. Switching at the calculated frequency transforms (aliases) the harmonics or frequency components respectively back to the fundamental or to DC. The switching frequency is calculated in accordance with the known aliasing equation Ws equals Wh plus Wa where Ws is equal to or less than 2*Wh where Ws equals the switching frequency, Wh equals the harmonic frequency or ripple frequency, and Wa equals an output frequency of the electrical power generating system which is either AC or zero. Theoretically, 50% of the energy present in each harmonic or frequency component which is transformed may be added to the overall operational efficiency of the electrical power generating system. The number of converter stages for transforming harmonics or frequency components is chosen as a function of the overall percentage of electrical power present in harmonics or ripple. When the invention is utilized in an AC power generating system, phase compensation dynamically compensates for phase delays consequent from processing of harmonics by one or more converters so that addition of the transformed harmonics to the fundamental does not occur with appreciable phase differences between the fundamental and the transformed harmonics being present.

A power generating system in accordance with the invention includes a converter for producing an AC output including a fundamental and at least one harmonic of the fundamental in response to applied control signals; a frequency analyzer, having at least one input coupled to the AC output, for providing an analysis of a frequency spectrum of the AC output; a processor, coupled to the frequency analyzer, for calculating at least one switching frequency, each switching frequency being used for transforming a different harmonic within the AC output back to the fundamental; a controller, responsive to the at least one calculated switching frequency, for producing control signals for transforming the at least one harmonic back to the fundamental and control signals for the converter producing the AC output; a separating filter, coupled to the AC output, for separating the AC output into the fundamental and the at least one harmonic; at least one additional converter, coupled to the at least one harmonic from the filter and to the controller, each converter being switched by control signals from the controller which have a calculated switching frequency for transforming one of the at least one harmonics to the fundamental; and outputs from the at least one converter being combined with the fundamental from the separating filter. The frequency analyzer identifies harmonics which have a voltage above a threshold; and the processor calculates at least one switching frequency with each switching frequency being for transforming a different harmonic having a voltage level above the threshold and each switching frequency Ws equals Wh plus Wa where Ws is equal to or less than 2*Wh equals the transformed fundamental frequency. A low pass filter is coupled to an output of each of the at least one additional converter for attenuating harmonics above the fundamental with an output of the low pass filter being coupled to the fundamental produced by the separating filter. The invention further includes a phase reference signal generator, coupled to the AC output from the converter, for producing a signal representative of a phase shift produced by the separating filter; a phase comparator, coupled to the AC output produced by the separating filter and the signal representative of phase shift, for producing a phase error control signal proportional to a difference between the fundamental from the separating filter and the signal representative of the phase shift; and the controller is responsive to the phase error control signal for varying the control signals to change phase of an output produced by one of the converters so that the fundamental from the separating filter is in phase with the output of each of the at least one additional converters. The one converter may be the converter producing the AC output or one of the at least one additional converters.

A DC power generating system in accordance with the invention includes a converter for producing an AC output; a transformer, coupled to the AC output, for producing an AC output having a voltage different than the AC output of the converter; a frequency analyzer, having at least one input coupled to the AC output from the transformer, for providing an analysis of a frequency spectrum of the AC output; a processor, coupled to the frequency analyzer, for calculating at least one switching frequency, each switching frequency being used for transforming a different frequency component within the AC output back to DC; a controller, responsive to the at least one switching frequency, for producing control signals for transforming at least one frequency component back to DC; a separating filter, coupled to the AC output for separating the AC output into DC and at least one frequency component; at least one additional converter, coupled to the at least one frequency component from the converter and to the controller, each converter being switched by control signals from the controller which have a calculated switching frequency for transforming one of the at least one frequency components to DC; and outputs from the at least one converter being combined with the DC from the separating filter. The frequency analyzer identifies frequency components which have a voltage above a threshold; and the processor calculates at least one switching frequency with each switching frequency for a frequency component having a voltage level above the threshold and each switching frequency Ws equals Wh plus Wa where Ws is equal to or less than Wh, Wh equals a frequency component and Wa is zero. A low pass filter is coupled to an output of at least one additional converter for attenuating AC components with an output of the low pass filter being coupled to the DC produced by the separating filter.

A method of power generation of AC at a fundamental frequency in accordance with the invention includes switching a DC potential to generate an AC output including a fundamental and at least one harmonic of the fundamental; analyzing a frequency spectrum of the AC output to detect at least one harmonic which is above a threshold voltage; calculating at least one switching frequency with each switching frequency being used for transforming a separate harmonic of the at least one harmonic to the fundamental; separating the at least one harmonic of the fundamental from the fundamental and switching the at least one separated harmonic of the fundamental at least one calculated switching frequency to transform at least one harmonic to the fundamental. The transformed fundamental is low pass filtered for attenuating harmonics within the transformed fundamental prior to combining the transformed fundamental with the fundamental; and each switching frequency Ws equals Wh plus Wa where Ws is equal to or less than 2*Wh, Wh equal a harmonic frequency and Wa equals a transformed frequency. The switching of the at least one harmonic is modified in response to a phase error control signal which is a function of a difference between a phase shift produced by separating the fundamental and the at least one harmonic and the fundamental produced by separation to cause the transformed fundamental to have a phase which matches a phase of the fundamental produced by separation.

A method of power generation of DC in accordance with the invention includes switching a DC potential to generate an AC output having a first voltage; transforming the AC output of the first voltage to produce an AC output of the second voltage; analyzing a frequency spectrum of the AC output of a second voltage to detect an AC component which is above a threshold; calculating at least one switching frequency with each switching frequency being used for transforming a separate frequency component to DC; producing DC from the AC output of the voltage; separating at least one frequency component from the DC and switching the at least one separated frequency component at at least one calculated switching frequency to transform at least one frequency component to DC. The transformed DC is low pass filtered for attenuating any frequency components within the transformed DC prior to combining the transformed DC with the DC produced from the AC output of the second voltage; and each switching frequency Ws equals Wh plus Wa where Ws is equal to or less than 2*Wh, Wh equals a frequency component and Wa is zero.

A hybrid power generating system in accordance with the invention comprises an AC power generating unit; a DC power generating unit and a power generation system controller for controlling generation of electrical power by the power generating units wherein the AC power generating unit and the DC power generating unit respectively transform undesired harmonics to the fundamental and ripple to DC. The AC power generating unit may be in accordance with the power generating system described above and the DC power generating unit may be in accordance with the DC power generating system described above.

BEST MODE FOR CARRYING OUT THE INVENTION

Figure 1:
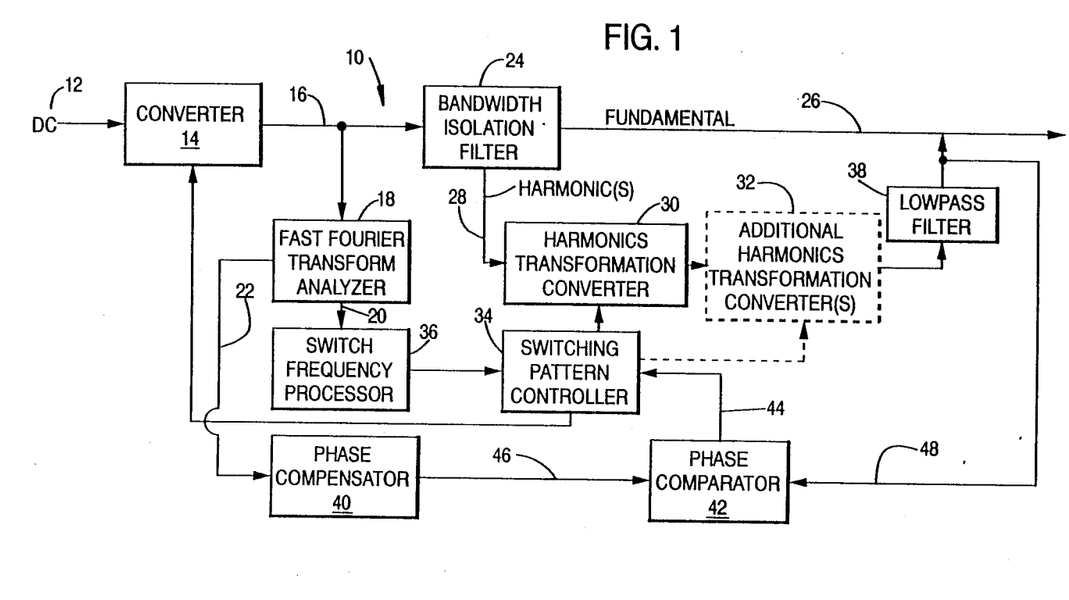
FIG. 1 illustrates a block diagram of an AC power generating system in accordance with the present invention.
Figure 2:
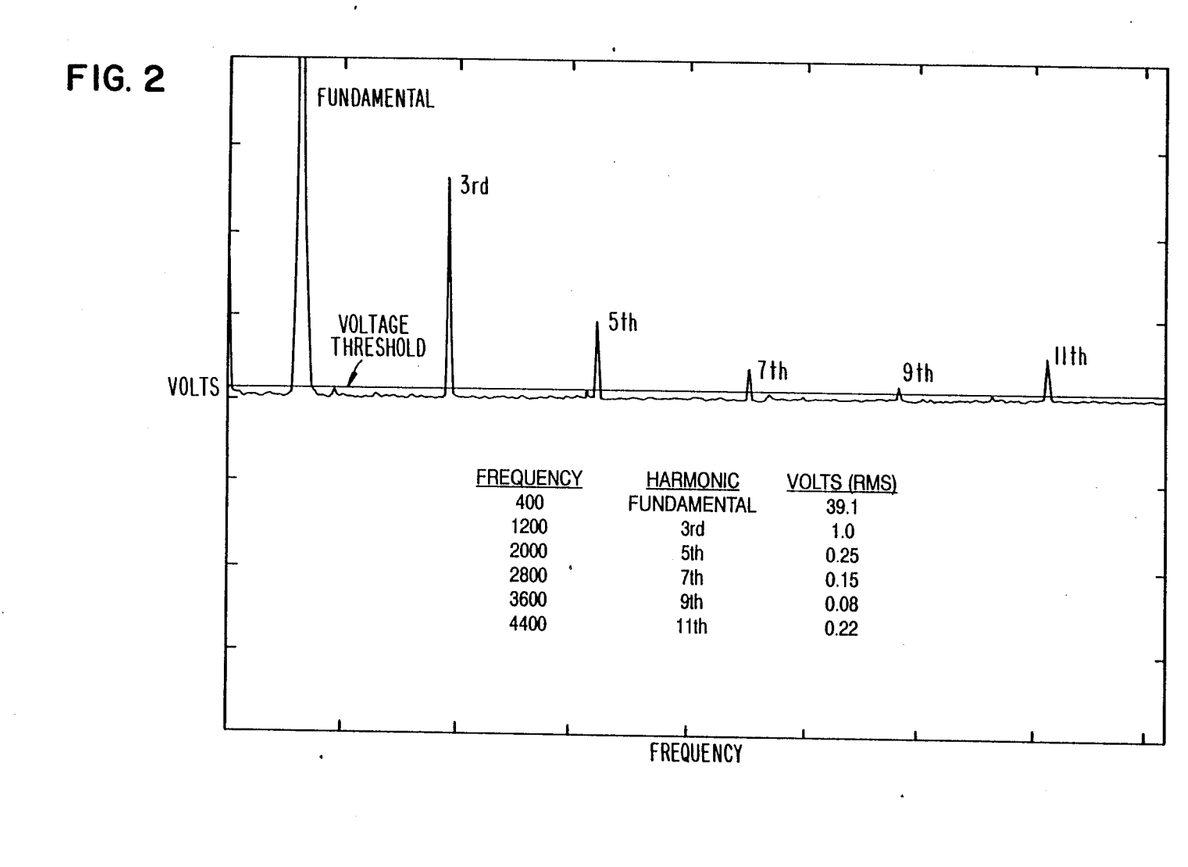
FIG. 2 illustrates a spectral analysis typical of a single phase of 400 Hz. AC power generated by an airframe power generating system.

FIG. 1 illustrates an AC electrical power generating system 10 in accordance with the present invention. The AC power generating system functions to transform (alias) harmonics to the fundamental frequency to increase the overall power generation efficiency over that achievable with the prior art as a consequence of the energy contained in one or more harmonics being frequency transformed to contribute to the overall output power produced. The DC source 12 applies a DC potential which may be produced by a battery or rectification of AC power generated by an airframe propulsion engine from a wild frequency generator. A converter 14, which may be a standard inverter, produces an AC output 16 which contains multiple phases. It should be understood that the processing circuitry illustrated in FIG. 1 illustrates circuitry for processing only a single phase of the three phase output which is conventionally produced by an inverter. Each phase of a multiple phase power supply would be in accordance with FIG. 1. Each phase has a spectral content such as that illustrated in FIG. 2. Most of the energy contained in each phase is at the fundamental which in an airframe application is 400 Hz. As is apparent from FIG. 2, substantial energy is also present at the third, fifth, seventh, ninth and eleventh harmonics which may represent from 3%-8% of the overall energy outputted from each phase of the three phase output 14. A fast Fourier transform analyzer 18 analyzes the spectral content of the AC output 16 and detects the voltage level of each of the harmonics as illustrated in FIG. 2. The harmonics are outputted on output 20. The fast Fourier transform analyzer 22 in combination with phase compensator 40 discussed below functions as a phase reference signal generator. The fast Fourier transforms analyzer 22 also detects the zero crossing points of the fundamental frequency present in the AC output 16. The phase reference signal outputted by the phase compensator 40 compensates for the effect produced by bandwidth isolation filter 24 in separating the AC output 16 into a fundamental signal path 26 containing the fundamental frequency present in the AC output and a harmonic signal path 28 which contains all of the harmonics. The bandwidth isolation filter 24 is analogous to a crossover network used in a stereo system for processing different audio frequencies.

The present invention transforms one or more harmonics present in the harmonic signal path 28 to the fundamental frequency. A harmonics transformation converter 30 transforms one of the harmonics present in the AC output 16 to the fundamental frequency 16. One or more additional harmonics transformation converters 32 may optionally be provided for transforming additional harmonics to the fundamental. Those harmonics which are transformed by the converters 30 and 32 are chosen to transform the harmonics having the highest energy content to the fundamental. Typically, the choice of the harmonics which are to be transformed to the fundamental would be based solely upon the relative energy content present in the harmonics with the highest energy content harmonics being transformed. The choice of harmonic(s) to be transformed is dynamically variable such that different harmonics are transformed to the fundamental as the power level of the harmonics varies. If the energy content of a harmonic is relatively low, the improvement in efficiency which is obtained may not be worth the cost and weight penalty involved in the additional harmonics transformation converter 32 necessary for transforming the harmonic. Each of the harmonics transformation converters 30 and 32 are controlled by a switching pattern controller 34 which generates a switching signal having a frequency Ws which equals Wh plus Wa where Ws is equal to or less than 2*Wh wherein Ws is the switching frequency, Wh is the harmonic frequency to be transformed and Wa is the frequency to which the harmonic is to be transformed which is the fundamental frequency present in the AC power 16. For example, if it is desired to transform the third harmonic back to the fundamental, which is the harmonic having the highest power content as illustrated in FIG. 2, the switching frequency Ws equals 1200 plus 400 which equals 1600 Hz. The harmonics transformation converter is a switch in series with the harmonics output 28. The theory of transformation (aliasing) is well known in sampling theory when the sampling rate is less than twice the highest frequency existing in the original signal. The switching pattern controller 34 is responsive to switching frequencies which are calculated by the switch frequency processor 36 in accordance with the aforementioned equation to provide the switching frequencies identified by the switch frequency processor 36 which are above a threshold such as in FIG. 2 to be applied to each of the harmonics transformation converters 30 and 32. Thus, for example, if a total of 4 harmonic transformation converters 30 and 32 were present, the switch frequency processor 36 would identify the third, fifth, seventh and eleventh harmonics if the fast Fourier transform analyzer 18 outputted a spectral analysis as illustrated in FIG. 2. The function of the switch frequency processor is to identify a number of harmonics equal to the number of harmonics transformation converters 30 and 32 which contain the highest energy content. As a consequence of the energy content of the harmonics being typically smaller than the fundamental (3-8%) the switches within the converters 30 and 32 may be downsized from those of a typical inverter with a resultant weight and cost savings. A low pass filter 38 is in series with the outputs of the harmonics transformation converters 30 and 32 for attenuating any spectral components above the fundamental frequency which are not transformed by the harmonics transformation converters 30 and 32.

In order to avoid distortion of the fundamental frequency within the AC output 16 from the converter 14, it is necessary that the phase of the transformed harmonics in the harmonics path 28 be matched with the phase of the fundamental present in the fundamental signal path 26. The aforementioned zero crossing points outputted on output 22 of the fast Fourier transform analyzer 18 are processed to generate a phase reference signal on line 46 by phase compensator 40 indicative of the expected phase shift which would be caused by the bandwidth isolation filter 24 in separating the fundamental component on the signal path 26. The phase compensator 40 emulates the phase delay characteristic of the bandwidth isolation filter 24 to generate the phase reference signal used for controlling the phase between the transformed harmonics and the fundamental present in signal path 26. A phase comparator 42 generates an error control signal on output 44 which is equal to the difference between the output 46 from the phase compensator 40 representative of the expected phase shift caused to the fundamental by the bandwidth isolation filter 24 and the actual transformed harmonics after filtering is outputted from the low pass filter 38 on line 48. The switching pattern controller 34 also generates the switching control signals for operating the converter 14 which, as described above, may be a conventional inverter. Phase compensation may be produced by either applying a lagging switching pattern to the converter 14 from the switching pattern controller 34 as a function of the error signal 44 or a leading phase switching pattern to each of the harmonics transformation converters 30 and 32. Software in the phase comparator 42 changes the relative signs (+, −) of the inputs 46 and 48 depending upon whether leading or lagging phase control is to be used in the switching patterns for the harmonics transformation converters 30, 32 and the converter 14, respectively.

Figure 3:
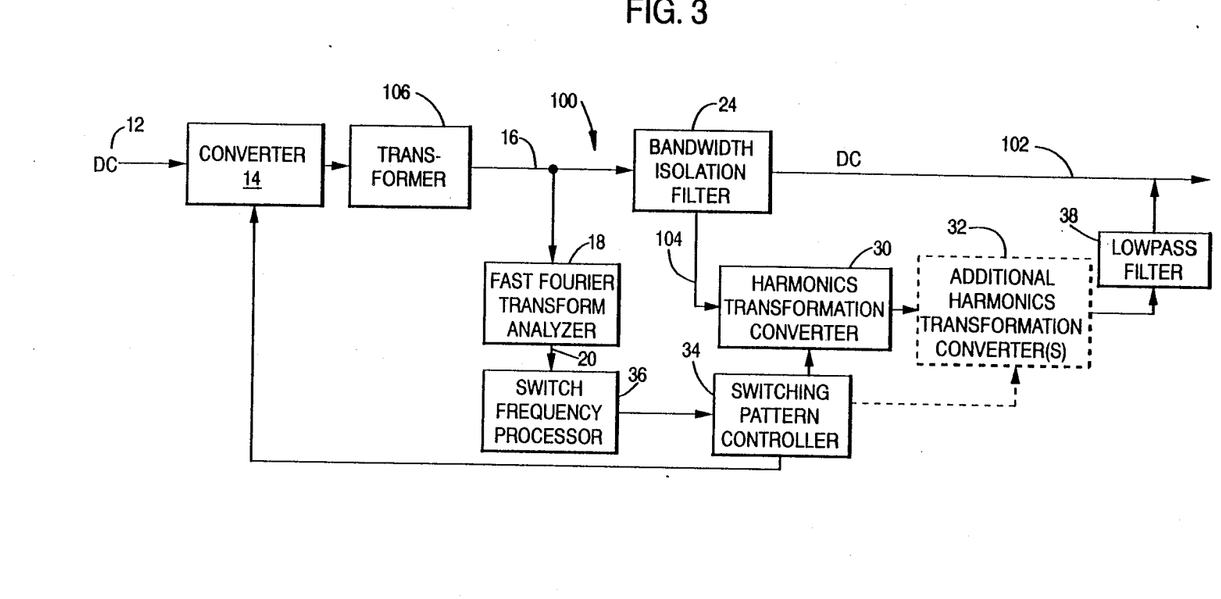
FIG. 3 illustrates a block diagram of a DC power generating system in accordance with the present invention.

FIG. 3 illustrates a DC power generating system 100 in accordance with the present invention which functions to convert a DC input from a first voltage to a second voltage which typically is a higher voltage. Like reference numerals identify like parts in FIGS. 1 and 3. The difference between the DC power generating system 100 of FIG. 3 and the AC power generating system 10 of FIG. 1 is that the switching frequencies applied to the harmonics transformation converters 30 and 32 are chosen to produce a DC component instead of the fundamental frequency as with the system of FIG. 1. Additionally, the bandwidth isolation filter 24 may produce a DC component on signal path 102 by rectification and separate ripple on signal path 104 by filtering after rectification. In order to obtain stepping up or stepping down of the DC potential 12 in the output 102, the transformer 106 is connected between the output of the converter 14 and the bandwidth isolation filter 24. The transformer 106 steps up or steps down the magnitude of the AC output produced by converter 14 to achieve the desired DC voltage on output 102.

Figure 4:
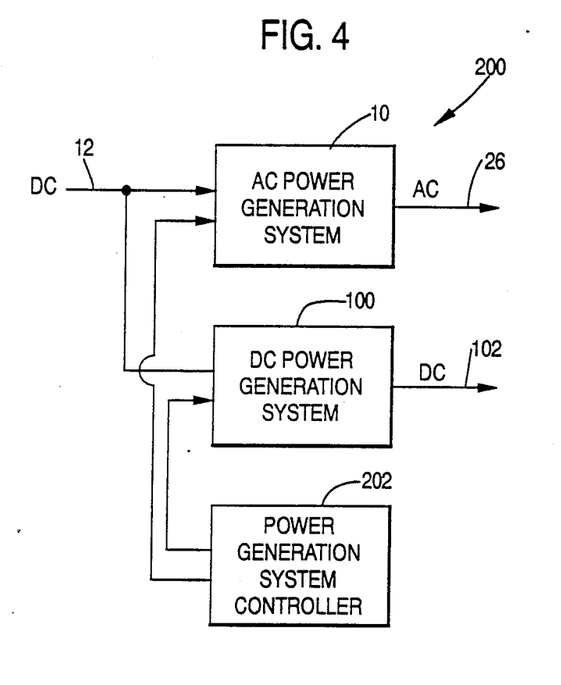
FIG. 4 illustrates a block diagram of a hybrid power generating system utilizing the AC power generating system of FIG. 1 and the DC power generating system of FIG. 3.

FIG. 4 illustrates a hybrid power generating system 200 in accordance with the present invention. Like reference numerals identify like parts in FIGS. 1, 3 and 4. The hybrid power generating system 200 is comprised of at least one AC power generating system 10 in accordance with FIG. 1 and at least one DC power generating system 100 in accordance with FIG. 3. For future airframe applications, hybrid power generating systems have been proposed which utilize a combination of 400 Hz. AC and 270 volt DC. A power generation system controller 202 controls the activation of the AC power generating system 10 and the DC power generating system 100 to selectively provide three phase AC power at 400 Hz., DC power at potentials such as, but not limited to 270 volts, or both AC and DC power.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:
1. A power generating system comprising:
a converter for producing an AC output including a fundamental and at least one harmonic of the fundamental in response to applied control signals;
a frequency analyzer, having at least one input coupled to the AC output, for providing an analysis of a frequency spectrum of the AC output;
a processor, coupled to the frequency analyzer, for calculating at least one switching frequency, each switching frequency being used for transforming a different harmonic within the AC output to the fundamental;
a controller, responsive to the at least one calculated switching frequency, for producing control signals at the at least one calculated switching frequency for transforming the at least one harmonic back to the fundamental and control signals for the converter for producing the AC output;
a separating filter, coupled to the AC output, for separating the AC output into the fundamental and the at least one harmonic;
at least one additional converter, coupled to the at least one harmonic from the converter and to the controller, each converter being switched by control signals from the controller which have a calculated switching frequency for transforming one of the at least one harmonics to the fundamental; and
outputs from the at least one converter being combined with the fundamental from the separating filter.

2. A power generating system in accordance with claim 1 wherein:
the frequency analyzer identifies harmonics which have a voltage above a threshold; and
the processor calculates at least one switching frequency with each switching frequency being a different harmonic having a voltage level above the threshold and each switching frequency Ws equal Wh plus Wa where Ws is equal to or less than 2*Wh, Wh equals a harmonic frequency and Wa equals the transformed fundamental frequency.

3. A power generating system in accordance with claim 1 further comprising:
a low pass filter, coupled to an output of each of the at least one additional converter, for attenuating harmonics above the fundamental with an output of the low pass filter being coupled to the fundamental produced by the separating filter.

4. A power generating system in accordance with claim 2 further comprising:
a low pass filter, coupled to an output of each of the at least one additional converter, for attenuating harmonics above the fundamental with an output of the low pass filter being coupled to the fundamental produced by the separating filter.

5. A power generating system in accordance with claim 1 further comprising:
a phase reference signal generator, coupled to the AC output from the converter, for producing a signal representative of a phase shift produced by the separating filter;
a phase comparator, coupled to the AC output produced by the separating filter and the signal representative of phase shift, for producing a phase error control signal proportional to a difference between the fundamental from the separating filter and the signal representative of phase shift; and
the controller is responsive to the phase error control signal for varying the control signals to change phase of an output produced by one of the converters so that the fundamental from the separating filter is in phase with the output of each of the at least one additional converters.

6. A power generating system in accordance with claim 5 wherein:
the one of the converters is the converter for producing an AC output.

7. A power generating system in accordance with claim 5 wherein:
the one of the converters is the at least one additional converter.

8. A power generating system in accordance with claim 2 further comprising:
a phase reference signal generator coupled to the AC output from the converter, for producing a signal representative of a phase shift produced by the separating filter;
a phase comparator, coupled to the AC output produced by the separating filter and the signal representative of phase shift, for producing a phase error control signal proportional to a difference between the fundamental from the separating filter and the signal representative of phase shift; and
the controller is responsive to the phase error control signal for varying the control signals to change phase of an output produced by one of the converters so that the fundamental from the separating filter is in phase with the output of each of the at least one additional converters.

9. A power generating system in accordance with claim 8 wherein:
the one of the converters is the converter for producing an AC output.

10. A power generating system in accordance with claim 8 wherein:
the one of the converters is the converter for producing an AC output.

11. A power generating system in accordance with claim 3 further comprising:
a phase reference signal generator coupled to the AC output from the converter, for producing a signal representative of a phase shift produced by the separating filter;
a phase comparator, coupled to the AC output produced by the separating filter and the signal representative of phase shift, for producing a phase error control signal proportional to a difference between the fundamental from the separating filter and the signal representative of phase shift; and
the controller is responsive to the phase error control signal for varying the control signals to change phase of an output produced by one of the converters so that the fundamental from the separating filter is in phase with the output of each of the at least one additional converters.

12. A power generating system in accordance with claim 11 wherein:
the one of the converters is the converter for producing an AC output.

13. A power generating system in accordance with claim 11 wherein:
the one of the converters is the at least one additional converter.

14. A power generating system in accordance with claim 4 further comprising:
a phase reference signal generator coupled to the AC output from the converter, for producing a signal representative of a phase shift produced by the separating filter;
a phase comparator, coupled to the AC output produced by the separating filter and the signal representative of phase shift, for producing a phase error control signal proportional to a difference between the fundamental from the separating filter and the signal representative of phase shift; and
the controller is responsive to the phase error control signal for varying the control signals to change phase of an output produced by one of the converters so that the fundamental from the separating filter is in phase with the output of each of the at least one additional converters.

15. A power generating system in accordance with claim 14 wherein:
the one of the converters is the converter for producing an AC output.

16. A power generating system in accordance with claim 14 wherein:
the one of the converters is the at least one additional converter.

17. A DC power generating system comprising:
a converter for producing an AC output;
a transformer, coupled to the AC output, for producing a transformed AC output having a voltage different than the AC output of the converter;
a frequency analyzer, having at least one input coupled to the AC output of the transformer, for providing an analysis of a frequency spectrum of one of the AC outputs;
a processor, coupled to the frequency analyzer, for calculating at least one switching frequency, each switching frequency being used for transforming a different frequency component within the AC output back to DC;
a controller, responsive to the at least one calculated switching frequency, for producing control signals at the at least one calculated switching frequency for transforming at least one frequency component back to DC;
a separating filter, coupled to the AC output, for separating the AC output into DC and the at least one frequency component;
at least one additional converter, coupled to the at least one frequency component from the converter and to the controller, each converter being switched by control signals from the controller which have a calculated switching frequency for transforming one of the at least one frequency components to DC; and
outputs from the at least one converter being combined with the DC from the separating filter.

18. A power generating system in accordance with claim 17 wherein:
the frequency analyzer identifies frequency components which have a voltage above a threshold; and
the processor calculates at least one switching frequency with each switching frequency for a frequency component having a voltage level above the threshold and each switching frequency Ws equals Wh plus Wa where Ws is equal to or less than 2*Wh, Wh equals a frequency component and WA is zero.

19. A power generating system in accordance with claim 17 further comprising:
a low pass filter, coupled to an output of each of the at least one additional converter, for attenuating AC components with an output of the low pass filter being coupled to the DC produced by the separating filter.

20. A power generating system in accordance with claim 18 further comprising:
a low pass filter, coupled to an output of each of the at least one additional converter, for attenuating AC components with an output of the low pass filter being coupled to the DC produced by the separating filter.

21. A method of power generation of AC at a fundamental frequency comprising:
switching a DC potential to generate an AC output including a fundamental and at least one harmonic of the fundamental;
analyzing a frequency spectrum of the AC output to detect at least one harmonic which is above a threshold voltage;
calculating at least one switching frequency with each switching frequency being used for transforming a separate harmonic of the at least one harmonic to the fundamental; and
separating the at least one harmonic of the fundamental from the fundamental and switching at least one separated harmonic of the fundamental at least one calculated switching frequency to transform at least one harmonic to the fundamental.

22. A method in accordance with claim 21 further comprising:
low pass filtering the transformed fundamental for attenuating harmonics within the transformed fundamental prior to combining the transformed fundamental with the fundamental and each switching frequency Ws equals Wh plus Wa where WS is equal to or less than 2*Wh; Wh equals a harmonic frequency and Wa equals a transformed frequency.

23. A method in accordance with claim 21 further comprising:
modifying the switching of the at least harmonic in response to a phase error control signal which is a function of a difference between a phase shift produced by separating the fundamental and the at least one harmonic and the fundamental produced by separation to cause the transformed fundamental to have a phase which matches a phase of the fundamental produced by separation.

24. A method in accordance with claim 22 further comprising:
low pass filtering the transformed fundamental for attenuating harmonics within the transformed fundamental prior to combining the transformed fundamental with the fundamental and each switching frequency Ws equals Wh plus Wa where WS is equal to or less than 2*Wh; Wh equals a harmonic frequency and Wa equals transformed frequency.

25. A method of power generation of DC comprising:
switching a DC potential to generate an AC output having a first voltage;
transforming the AC output of the first voltage to produce an AC output of a second voltage;
analyzing a frequency spectrum of one of the AC outputs to detect an AC component which is above a threshold voltage;
calculating at least one switching frequency with each switching frequency being used for transforming a separate frequency component to DC;
producing DC from the AC output of the second voltage; and
separating at least one frequency component from the DC and switching at least one separate frequency component at at least one calculated switching frequency to transform at least one frequency component to DC.

26. A method in accordance with claim 25 further comprising:
low pass filtering the transformed DC for attenuating any frequency components within the transformed DC prior to combining the transformed DC with the DC produced from the AC output of the second voltage; and
each switching frequency Ws equals Wh plus Wa where Ws is equal to or less than 2*Wh, Wh equals a frequency component and Wa is zero.

27. A hybrid power generating system comprising:
an AC power generating unit including:
(a) a converter for producing an AC output including a fundamental and at least one harmonic of the fundamental in response to applied control signals;
(b) a frequency analyzer, having at least one input coupled to the AC output, for providing an analysis of a frequency spectrum of the AC output;
(c) a processor, coupled to the frequency analyzer, for calculating at least one switching frequency, each switching frequency being used for transforming a harmonic within the AC output back to the fundamental;
(d) a controller, responsive to the at least one switching frequency, for producing control signals for transforming the at least one switching frequency back to the fundamental and control signals for the converter for producing the AC output;
(e) a first separating filter, coupled to the AC output, for separating the AC output into the fundamental and the at least one harmonic;
(f) at least one additional converter, coupled to the at least one harmonic from the converter and to the controller, each converter being switched by control signals from the controller which have a switching frequency for transforming one of the at least one harmonics to the fundamental; and
(g) outputs from the at least one converter being combined with the fundamental from the first separating filter;
a DC power generating unit including:
(a) a converter for producing an AC output;
(b) a transformer, coupled to the AC output, for producing a transformed AC output having a voltage different than the AC output of the inverter;
(c) a frequency analyzer, having at least one input coupled to the AC output from the transformer, for providing an analysis of a frequency spectrum of one of the AC outputs;
(d) a processor, coupled to the frequency analyzer, for calculating at least one switching frequency, each switching frequency being used for transforming a different frequency component within the AC output back to DC;
(e) a controller, responsive to the at least one switching frequency, for producing control signals for transforming at least one frequency component back to DC;

(f) a second separating filter, coupled to the AC output, for separating the AC output into the DC and the at least one frequency component;

(g) at least one additional converter, coupled to the at least one frequency component from the converter and to the controller, each converter being switched by control signals from the controller which have a switching frequency for transforming one of the at least one frequency components to DC; and (h) outputs from the at least one converter being combined with the DC from the second separating filter; and a power generation system controller for controlling generation of electrical power by the power generating units.

28. A hybrid power generating system in accordance with claim 27 wherein:

in the AC power generating unit the frequency analyzer identifies harmonics which have a voltage above a threshold; the processor calculates a switching frequency for at least one harmonic having a voltage level above the threshold; and a low pass filter is coupled to an output of each of the at least one additional converter for attenuating harmonics above the fundamental with an output of the low pass filter being coupled to the fundamental produced by the first separating filter; and each switching frequency Ws equals Wh plus Wa where Ws is equal to or less than 2*Wh, Wh equals a harmonic frequency and Wa equals the transformed fundamental frequency; and in the DC power generating unit a low pass filter is coupled to an output of each of the at least one additional converter for attenuating AC components with an output of the low pass filter being coupled to the DC produced by the separating filter; and each switching frequency Ws equals Wh plus Wa where Ws is equal to or less than 2*Wh, Wh equals a frequency component and Wa is zero.

29. A hybrid power generating system in accordance with claim 27 further comprising:

a phase reference signal generator, coupled to the AC output from the separating filter, for producing a signal representative of a phase shift produced by the separating filter;

a phase comparator, coupled to the AC output produced by the separating filter, and the signal representative of phase shift, for producing phase error control signal proportional to a difference between the fundamental from the separating filter and the signal representation of phase shift; and the controller of the AC power generating unit is responsive to the phase error control signal for varying the control signals to change phase of an output produced by one of the converters so that the fundamental from the first separating filter is in phase with the output of each of the at least one additional converters of the AC power generating unit.

30. A hybrid power generating system in accordance with claim 28 further comprising:

a phase reference signal generator, coupled to the AC output from the first separating filter, for producing a signal representative of a phase shift produced by the first separating filter;

a phase comparator, coupled to the AC output produced by the separating filter, and the signal representative of phase shift, for producing phase error control signal proportional to a difference between the fundamental from the separating filter and the signal representation of phase shift; and the controller is responsive to the phase error control signal for varying the control signals to change phase of an output produced by one of the converters of the AC power generating unit so that the fundamental from the first separating filter is in phase with the output of each of the at least one additional converters of the AC power generating unit.

31. A hybrid power generating system in accordance with claim 29, wherein:

the one of the converters is the converter for producing an AC output.

32. A hybrid power generating system in accordance with claim 29 wherein:

the one of the converters is the at least one additional converter.

33. A hybrid power generating system in accordance with claim 30 wherein:

the one of the converters is the converter for producing an AC output.

34. A hybrid power generating system in accordance with claim 30 wherein:

the one of the converters is the at least one additional converter.

* * * * *